United States Patent

Wolfinger et al.

[11] 3,934,459
[45] Jan. 27, 1976

[54] TORQUE MONITORING SYSTEM FOR ROTATING SHAFT

[75] Inventors: John F. Wolfinger; Robert Quay, both of Schenectady; Joseph Tecza, Elnora, all of N.Y.

[73] Assignee: General Electric Company, Schenectady, N.Y.

[22] Filed: Oct. 10, 1974

[21] Appl. No.: 513,646

[52] U.S. Cl. ................................................ 73/70.1
[51] Int. Cl.² ........................................ G01H 1/10
[58] Field of Search.......... 73/67, 67.2, 70.1, 133 R, 73/136 R; 324/77 E

[56] References Cited
UNITED STATES PATENTS

| | | | |
|---|---|---|---|
| 3,581,561 | 6/1971 | Tomashek........................... | 73/117.2 |
| 3,641,550 | 2/1972 | Lynas et al. ...................... | 73/67.2 X |
| 3,657,922 | 4/1972 | Sibeud .............................. | 73/117.3 |
| 3,758,758 | 9/1973 | Games et al. .................... | 73/67.2 X |

Primary Examiner—Charles A. Ruchl
Attorney, Agent, or Firm—John F. Ahern; James W. Mitchell

[57] ABSTRACT

A monitor system is described which is capable of providing an output which indicates the oscillatory torque in each section of a multi-section shaft of a rotating system having plural masses. The system described is an electronic model of a mathematical analog of the rotating system and is based upon the assumption that the system may be represented as N inertias or masses interconnected by N−1 shafts — represented as springs. For such a system there are n−1 primary frequency oscillatory torques. If the inertias are large, the frequencies of these torques are low. Electrical signals representing the torques are sensed at one or more shaft sections and are filtered, amplified, passed through a plurality of weighting network and recombined to provide an indication of the total oscillatory torque in each of the N−1 shaft sections. Such torque, or an electrical output signal from a generator, in the instance of a turbine-generator set may be used to actuate an operative means or actuate a system alarm.

10 Claims, 4 Drawing Figures

TORQUE MONITORING SYSTEM FOR ROTATING SHAFT

The present invention relates to torque measurement and, more particularly, to a method and apparatus for measurement of oscillating torque in a plurality of shaft sections of a rotating shaft system.

BACKGROUND OF THE INVENTION

In any system of discrete masses and interconnecting elements, if the physical characteristics of the elements of the system are known, a mathematical relationship can be derived defining the motion and instantaneous position of each of the elements as a function of system excitation. An example of such a system is one represented by a plurality of masses interconnected by a plurality of springs. In such a spring-mass system, if the masses and the spring constants are known, then the movement of each element of the system can be defined in terms of the system excitation.

A turbine-generator system including plural turbine stages and a generator, with or without a rotating alternator (which may not be necessary if a static alternator is used) constitutes a complex system of many masses, some of which are large, as for example a generator or a turbine stage. On the other hand, many smaller masses such as couplings, gears and auxiliary systems are present. The many masses in a turbine-generator set are interconnected with varying shaft sections, all of which make up a composite shaft system. The respective shaft sections also have mass and inertia, but may be considered as having spring constants and are characterizable as springs (with the appropriate assumptions). Similarly, with appropriate assumptions limiting the number of masses to the principal masses of the system and by properly quantizing spring and mass parameters, it is possible to utilize the spring-mass system to analyze, identify and utilize oscillatory torque on the respective major shaft sections of the turbine-generator system. The application of the spring-mass method of analysis to a turbine-generator set is, however, in no sense of the word straightforward nor uncomplicated, but the principle is applicable if carefully applied.

Other complex rotating systems, with appropriate simplifying assumptions, may be similarly analyzed.

Any mechanical system has certain mechanical natural frequencies of oscillation at which the system may respond strongly to external stimuli. In a shaft-mass system, the number of mechanical natural frequencies of oscillation of the shafts is infinite, but if modeled by appropriate assumptions and characterizations so as to be treated as having a discrete number of masses and springs the number of natural frequencies of oscillation of the system is a function of the number of springs and masses, i.e., for a system of N masses, and N−1 interconnecting springs there will be N natural frequencies of oscillation. With large rotating shafts the oscillations of interest are torsional oscillations and, in the example of a turbine-generator system, considering the major components as discrete masses and the major shafts as discrete springs the predominant torsional natural frequencies of oscillation are in the sub-synchronous frequency range i.e., less than the generated frequency, e.g., 60 Hz, due to the relatively large masses of the system.

It has been found that in large turbine-generator systems, very small torsional oscillations in the shafts can cause stresses which may damage the shafts and in some instances result in shaft breakage and destruction of the system. Such damaging oscillations may have a peak amplitude as small as 0.01°. It has also been found that the oscillations which can reach destructive proportions tend to have high components at the predominant torsional natural frequencies of oscillation. The oscillatory stress or torque at any point on any shaft in the system is the algebraic sum of all instantaneous stresses or torques of all frequencies at that point and time. Furthermore, the stresses in any shaft is proportional to the oscillatory torque on that shaft. Therefore, by determination of oscillating torque on each interconnecting shaft, it is possible to determine the stress in the shaft.

Accordingly, the present invention provides a method and apparatus for determination of instantaneous torque in each interconnecting section of a rotating shaft system by measurement of the amplitude of torsional oscillations at one or more points in the system.

Additionally, since the electrical output of the generator of a turbine-generator set contains component signals proportioned to the relative motion of the rotor with respect to the stator, this electrical signal may be analyzed exclusively or in addition to the measurements made upon the rotating system; likewise to determine the instantaneous torsional oscillation of the generator. Similarly, such electrical measurement may be practiced for the same purpose with respect to any dynamoelectric machine.

It is therefore an object of the present invention to provide a method and apparatus for determination of instantaneous torque in a rotating system.

It is a further object of the invention to provide a method and apparatus for determination of instantaneous torque in a rotating system by measurement of torsional oscillations at one or more points on the system.

It is yet another object of the invention to provide a method and apparatus for determination of instantaneous torque in each element of a plural element rotating system by measurement of instantaneous torsional oscillations at a chosen one of a plurality of available points in the system.

Another object of the invention is to provide a method and apparatus for analyzing the electrical output of a dynamoelectric machine to determine the instantaneous torsional oscillations thereof.

In carrying out the objects of this invention, in one form thereof, a turbine-generator viewed as a plurality of discrete masses and interconnecting shaft system together with torsional oscillation measurement arrangement therefor is shown. The torsional oscillation measurement arrangement in the described embodiment comprises apparatus for sensing instantaneous torsional oscillations in the system and developing a signal proportional to the amplitude of such oscillations and further comprises filters for extracting from the signal only those frequency components corresponding to the torsional natural frequencies of oscillation of the system. Such signals, whether representative of either electrical or shaft-mechanical measurements containing the component frequencies, can then be multiplied by appropriate constants in a plurality of electronic weighting networks to produce output signals proportional to oscillating torque. Each weighting network corresponds to a different shaft section and utilizes different multiplying constants which are dependent upon the characteristics of the total system. Recombining of the individual torque components caused by each individual frequency component results in signals proportional to total oscillating torque in each shaft section.

DETAILED DESCRIPTION OF THE INVENTION

For a better understanding of the invention, reference may be had to the accompanying drawings in which.

Figure 1:
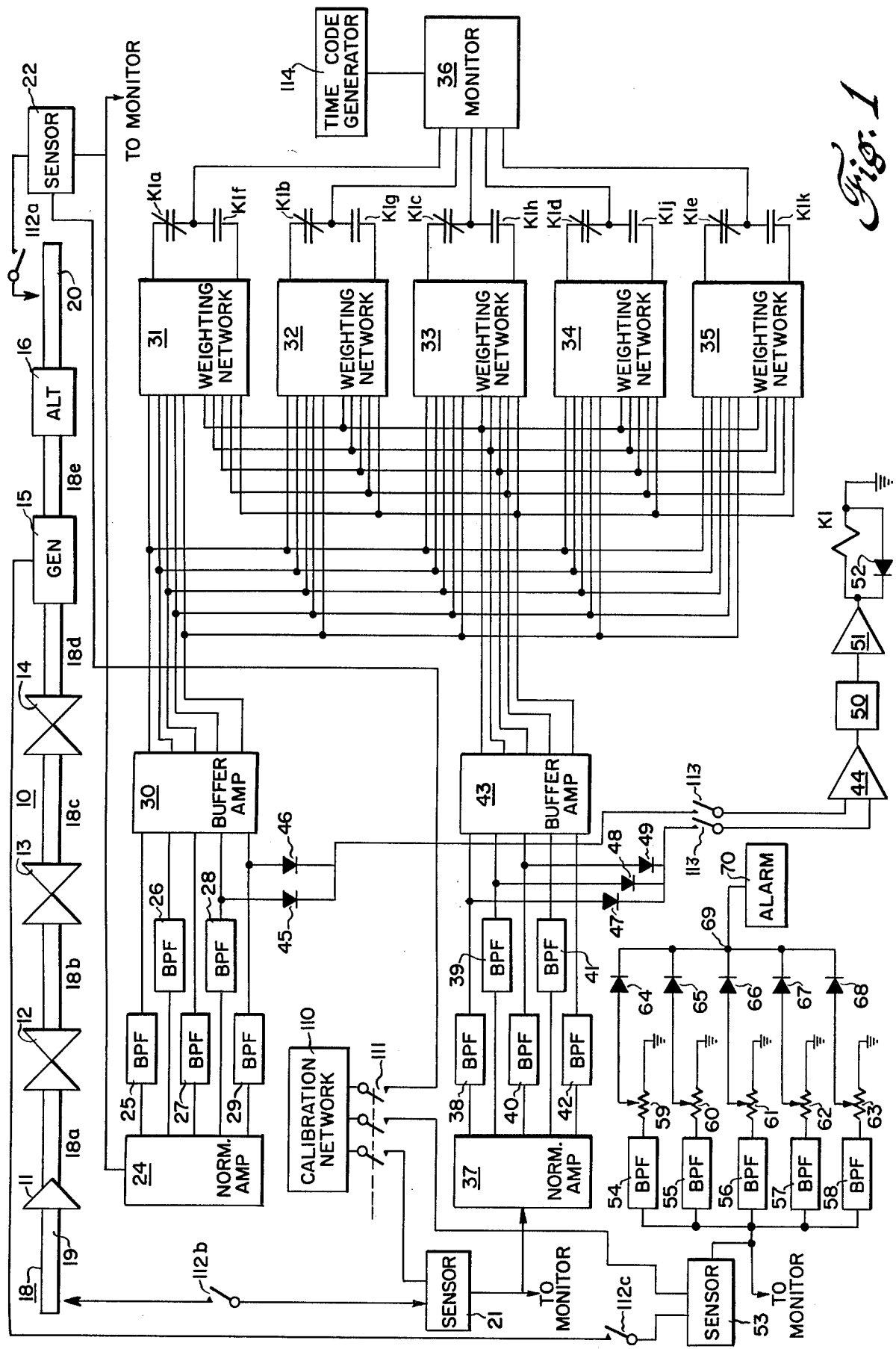
FIG. 1 is a block diagram of a system according to the present invention for determining torque in a complex rotating turbine-generator system, simplified for clarity of explanation.

Referring now to FIG. 1, a typical steam turbine-generator assembly is indicated generally at 10 and comprises a plurality of turbine stages 11, 12, 13 and 14, a generator 15 and an alternator 16, each of the aforementioned elements being interconnected by means of a composite shaft 18. Shaft 18 is comprised of a plurality of mechanically interconnected shaft sections 18a, 18b, 18c, 18d, 19 and 20. Shaft 18 includes a front standard section 19 and an alternator end section 20. In a conventional steam turbine-generator set sections 19 and 20 are the most available sections of the composite shaft system and, hence the most available sections at which measurement may normally be made. It is however possible to adapt any such apparatus in order to take measurements in accord with this invention at other portions of the shaft system. Such other measurement points may be chosen in order to take advantage of the motions in the particular mode of vibration of the system. In the illustrated embodiment sensor means 21 and 22 are associated with shaft sections 19 and 20, respectively. Sensor means 21 and 22 monitor rotation of the composite shaft 18 and output a signal proportional to the amplitude of all torsional oscillations in the system. Such sensor means are described in copending application Ser. No. 448,605, filed Mar. 6, 1974, now Pat. No. 3,885,420 issued May 27, 1975, and assigned to the present assignee, the disclosure of which is incorporated herein by reference thereto.

Sensor means 21 and 22 are similar and the outputs of each of the sensors are applied to similar circuitry. Sensor means 22 may be considered for purposes of explanation as being used as a primary signal source and sensor means 21 used as a secondary signal source. For simplicity of explanation, only the signal processing path for the primary signal developed at the output of sensor means 22 will be described, it being understood that for each element in the signal processing path for sensor means 22 there exists a corresponding element in the signal processing path for sensor means 21.

An output terminal of sensor means 22 is connected to an input terminal of a normalizing buffer amplifier 24, which amplifier 24 divides the sensor output signal into five signals for application to five mutually exclusive band-pass filters 25, 26, 27, 28 and 29, each of the filters being of a maximally flat characteristic (Butterworth) type, well known in the art. Each of the band-pass filters is centered at a different mechanical torsional natural frequency of oscillation of the shaft-mass system 10. As explained previously, for a system of N discrete masses and N−1 shafts, there exists N natural torsional frequencies of oscillation. However, one of these frequencies corresponds to zero, i.e., the frequency at which all the shaft sections are rotating in phase. Only the N−1 non-zero frequencies are of interest and, since the system illustrated has six assumably discrete masses and five shaft sections, only five frequency components are of interest.

The output signals derived by band-pass filters 25, 26, 27, 28 and 29 are applied to buffer or unity gain amplifiers in amplifier circuit 30 in order to isolate the band-pass filters from the loading effects of the remaining circuitry and also to provide inversion, since some of the weighting coefficients may be negative. The output signals from the buffer amplifier are then applied to a plurality of weighting networks 31, 32, 33, 34 and 35. Each of the weighting networks provides a predetermined amount of gain to each of the filtered signals and then recombines the weighted signals into one signal proportional to the oscillatory torque in each shaft. Each of the recombined signals is applied respectively by means of normally closed relay (assuming sensor means 22 to be the primary signal source) contacts K1a, K1b, K1c, K1d and K1e to a corresponding plurality of output terminals from whence the signals may be applied to apparatus such as, for example, a tape recorder 36 for future study or may be applied to some type of a measurement or alarm system or other utilization means, as for example a digital computer.

In the alternate signal system operating on signals received from sensor means 21, normalizing amplifier 37 corresponds to amplifier 24 and band-pass filters 38, 39, 40, 41 and 42 correspond to band-pass filters 25, 26, 27, 28 and 29 in the primary system and are similarly tuned. Furthermore, buffer amplifier 43 corresponds to buffer amplifier 30 in the primary system. As can be seen, weighting networks 31, 32, 33, 34 and 35 receive output signals from both buffer amplifier 30 and buffer amplifier 43, the combined signals from buffer amplifier 43 being applied to the normally open contacts of relay K1 and the signals from buffer amplifier 30 being applied to the normally closed contacts of relay K1.

Activation of relay K1 is controlled by comparator 44, which comparator is connected by means of diodes 45 and 46 to receive the signals from the outputs of filters 28 and 29, for example, on a first input terminal and by means of diodes 47, 48 and 49 to receive the signals from the outputs of filters 38, 39 and 40, for example, on a second input terminal. So long as either of the signals from filters 28 and 29 are of greater amplitude than all the signals from filters 38, 39 and 40, the output of comparator 44 remains at a logical level which will prevent activation of relay K1. When any one of the signals from filters 38, 39 and 40 exceeds the amplitude of both of the signals from filters 28 and 29, the output of comparator 44 will go to a high state applying a signal to a timer 50, which timer in turn will apply a signal to a relay driver amplifier 51, thereby activating relay K1. Timer 50 is provided to assure that K1 remains activated for a predetermined minimum time period, as for example 5 seconds, which is long as compared with the period of the signals of interest to ensure inclusion of a sufficient number of cycles of all the alternative signals to assure correct evaluation thereof. A suppression diode 52 bypasses relay K1 to minimize voltage spikes when voltage is removed from the relay.

In operation, considering first the assumed primary signal flow path, the output signals representing torsional oscillations in shaft system 18 are applied from the output of sensor means 22 to normalizing amplifier 24, the output signal from sensor means 22 is separated into five individual signals, each of which have the same frequency spectrum but each having a different amplitude since, as is well known to those skilled in the art, the attenuation of an unnormalized band-pass filter is directly proportional to its frequency range and normalization is necessary to assure correct proportioning of the signals at the output of the filters. Alternatively, if normalized filters are used and the amplitudes of the respective filtered signals are equal normalizing amplifier 24 is not required. The normalized signals from amplifier 24 are then applied to band-pass filters 25, 26, 27, 28 and 29. Each of the band-pass filters is centered at a different torsional natural resonant frequency of the turbine-generator system 10. These frequencies are delivered to the respective input terminals of buffer amplifier 30, and are such that each of the five signals, so delivered, represents the amplitude of torsional oscillations at section 20 of shaft 18 at one of the $N-1$ frequencies. By means of buffer amplifier 30 these filtered signals are then applied to weighting networks 31, 32, 33, 34 and 35.

Since each mechanical torsional natural frequency signal affects each individual section of the shaft 18 differently, the weighting networks are designed to adjust the relative proportions of the amplitudes of the individual frequency components such that when the components are recombined the resultant signal is proportional to the instantaneous torque, in one of the $N-1$ sections of shaft 18, because of the total affect of all the natural resonant frequency components. For example, weighting network 31 may be proportioned to provide a resultant output signal representative of the torque in the shaft 18a between turbine sections 11 and 12. The output signal from weighting network 31 is then proportional to the oscillating torque in that portion of the shaft 18a between turbine sections 11 and 12 and is applied via normally closed contacts Kla to a monitoring apparatus 36. Each of the weighting networks performs a similar function for a different section of shaft 18.

In one specific turbine-generator set in which oscillating torque monitoring was desirable and to which the concept of the present invention is applicable it was found that the two lowest frequency signals produced the highest amplitude torsional oscillations in shaft 18 and that these oscillations were greatest at alternator shaft section 20; however, if the three higher frequency signals developed at front standard shaft section 19 are of greater amplitude than the lowest frequency signals, the system is adapted to switch from utilizing the signals developed by sensor means 22 to utilizing the signals developed by sensor means 21. This is accomplished by monitoring the output signals from filters 28 and 29 and from filters 38, 39 and 40. The signals from filters 28 and 29 are applied by means of diodes 45 and 46 to one input terminal of comparator 44 and the signals from filters 38, 39 and 40 are applied by means of a circuit comprised of diodes 47, 48 and 49 to a second input terminal of comparator 44. If the three high frequency signals from sensor means 21 are of greater amplitude than the two low frequency signals from sensor means 22, comparator 44 will provide an output signal via timer 50 and relay driver 51 to relay Kl thereby opening the normally closed contacts of relay Kl and closing the normally open contacts Kl*f*, Kl*g*, Kl*h*, Kl*j* and Kl*k*. With these latter contacts closed, the signals developed by sensor means 21 are then processed through the secondary circuit and each of the weighting networks 31 through 35 to thereby develop input signals to monitor 36 from sensor 21. Obviously, any combination of measured signals to comparator 44 from BPF outputs may be used in accord with the characteristics of the particular rotating system being monitored.

In addition to the above-described portions of the monitor system, a third portion is provided which monitors the generator output current or voltage wave form, whichever is desired, and uses the variations in phase of this signal, which occur at the system natural frequencies as an alarm or monitor signal. This third portion comprises a sensor means 53 connected to monitor the generator output voltage or current. Sensor means 53 reduces the amplitude of the voltage or current wave form and rectifies it with a six phase rectifier. The second harmonic of the rectified signal is then sensed for phase variations as in sensor means 21 and 22. The resultant signal is then filtered by band-pass filters 54, 55, 56, 57 and 58. Each of the band-pass filters 54 through 58 is similar to those band-pass filters used in the first and second monitoring systems and these filters are likewise centered at the known torsional natural frequencies of oscillation of shaft system 18. The outputs of filters 54 through 58 are applied via potentiometers 59, 60, 61, 62 and 63 and respective diodes 64, 65, 66, 67 and 68 to a summing junction 69 from whence the signals are applied, for example, to an alarm circuit 70. The alarm circuit 70 may be simply a voltage detector which monitors the voltage at summing junction 69 and provides an alarm when the monitored voltage exceeds a predetermined level, for example, a voltage level corresponding to approximately 0.025 mechanical degrees, for example, of oscillation of the shaft 18. Alternatively, the output of sensor means 53 may be processed as are the outputs of sensor means 21 and 22 to provide $N-1$ signals to monitor 36 representative of oscillating torque. Due to the difference of the input signal and its source a different set of weighting functions are used.

A calibration network 110 is used to calibrate the system by using a known input to the respective sensor means. The input comprises a carrier signal at the frequency of respective sensors. Each carrier is phase modulated a known arbitrary amount by each of $N-1$ sinusoidal oscillators having frequencies corresponding to the natural torsional frequencies. This signal is applied through switches 111 to the sensor means and their normal input removed by means of manually operable switches 112 and operated at will to calibrate and test the monitoring system from the respective sensor means 21, 22 and 53 to monitor 36. A secondary switch 113 selects the output state of comparator 44 so that calibrator signals derived from either of respective sensor means 21, 22 or 53 goes to monitor 36. Switches 112 are operated only when switch 111 is operated. Additionally, the outputs of respective sensor means 21, 22 and 53 are directly fed to the monitor for recording and preservation. In order that the monitor/recorder input is associated with a known variable and may be correlated with the rotating system, a time-code generator 114 feeds a time reference signal into monitor 36.

Figure 2:
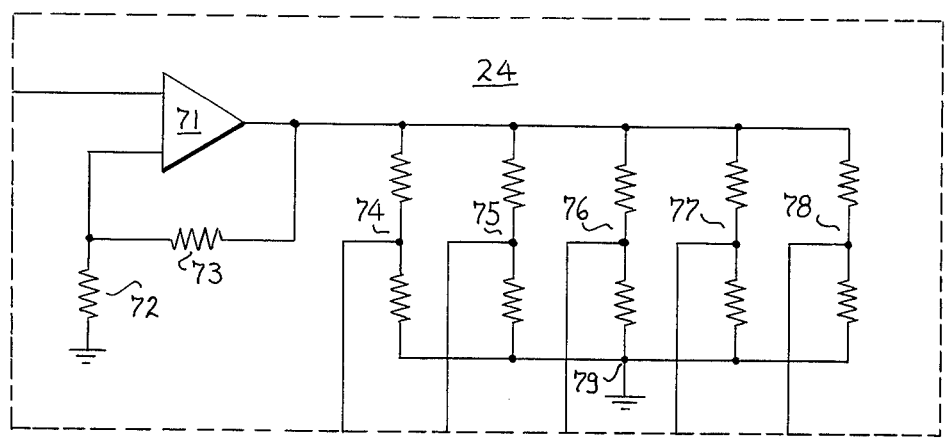
FIG. 2 is a more detailed diagram of the normalizing amplifier of FIG. 1.

Referring now to FIG. 2, there is shown a detailed embodiment of normalizing amplifier 24. Amplifier 24 comprises a linear amplifier 71 of a type well known in the art, including a biasing resistor 72 connected between a first input terminal of amplifier 71 and ground and a feedback resistor 73 connected between an output terminal of amplifier 71 and the first input terminal. A second input terminal of amplifier 71 is connected to receive the output signal from sensor 22. In order to provide the different amplitude output signals to be applied to the different filters in the system, the output signal developed by amplifier 71 is applied to a plurality of voltage divider networks 74, 75, 76, 77 and 78, each of which comprise first and second resistors. Each of the voltage divider networks is connected between the output terminal of amplifier 71 and a ground or common terminal 79. The output signals to be applied to the individual filters are then taken from the junction intermediate the first and second resistors of each of the voltage divider networks. By proper proportioning of the first and second resistors of each of the voltage divider networks 74 through 78, the amplitude of the signals applied to the respective band-pass filters 25 through 29 may be proportioned to overcome the amplification inherent in the filters themselves. Normalizing amplifier 37 is substantially identically constructed to amplifier 24; however, resistor valves are adjusted to compensate for the change in location of the sensor.

Figure 3:
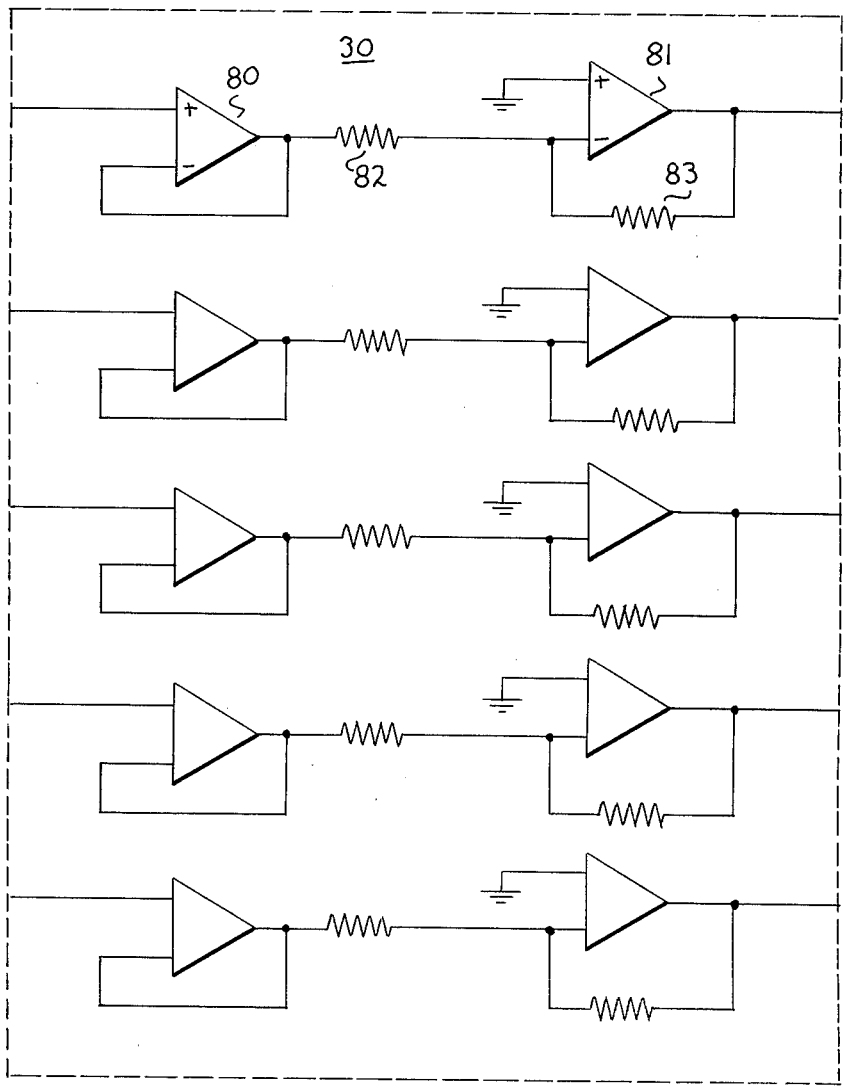
FIG. 3 is a more detailed diagram of the buffer amplifier circuit of FIG. 1; and, FIG. 4 is a more detailed diagram of the weighting network of FIG. 1.

Referring now to FIG. 3, there is shown a detailed diagram of buffer amplifier 30. As can be seen the amplifier 30 actually comprises five individual amplifiers, each of which is of a type well known in the art comprising a first unity gain stage having a high impedance, as represented by amplifier 80, and a second inverting stage represented by amplifier 81. The output signal from amplifier 80 is connected by means of resistor 82 to the inverting input terminal of amplifier 81. A feedback resistor 83 in conjunction with resistor 82 provides proportion gain for amplifier 81. As can be seen, each of the individual amplifiers in the circuit 30 are identical; thus, as a signal from one of the filters is supplied to the positive high input impedance terminal of amplifier 80, the signal is buffered and then applied to the inverting input terminal of amplifier 81 and from amplifier 81 to the weighting networks.

Figure 4:
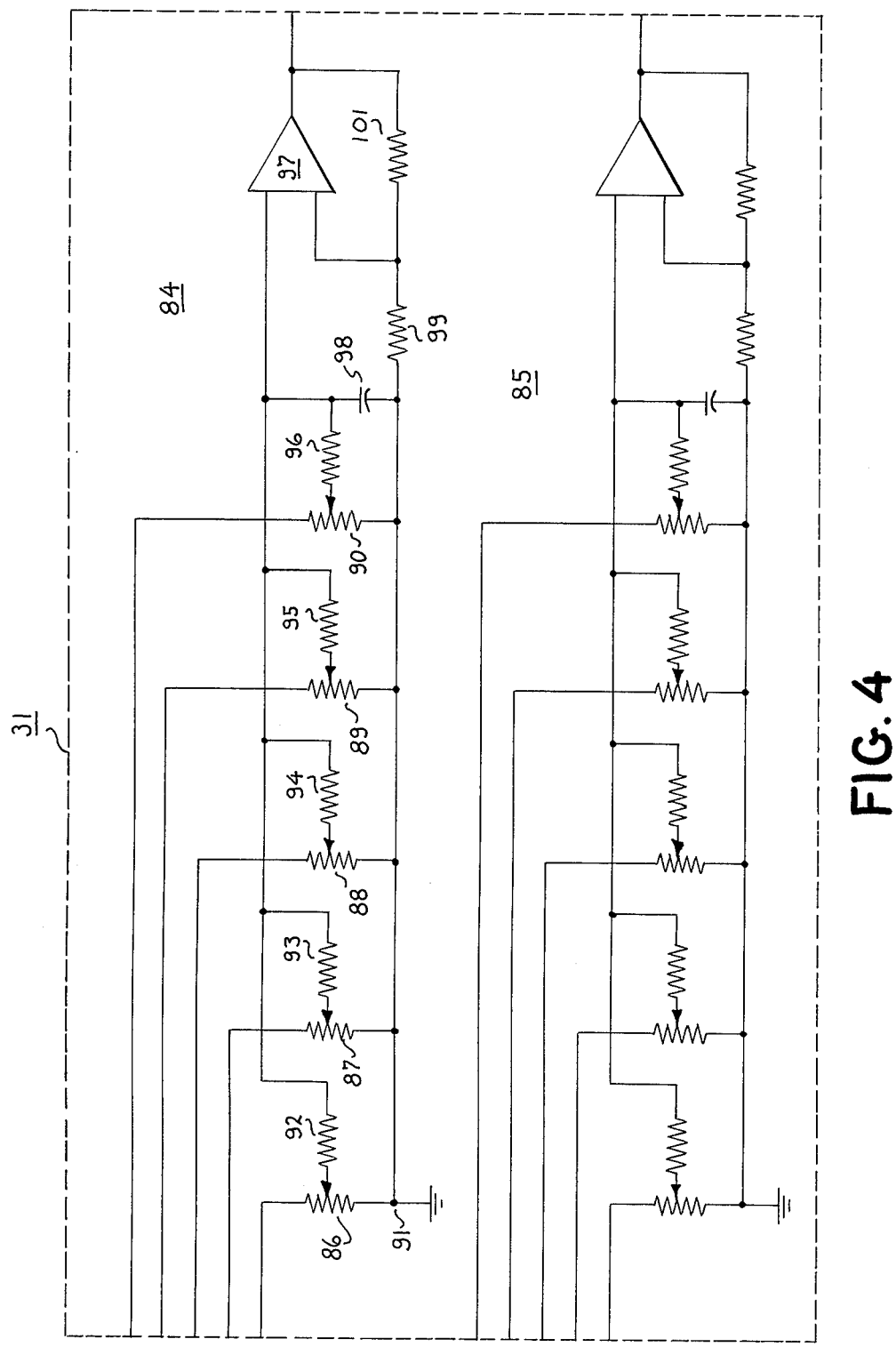

Referring now to FIG. 4, there is shown a more detailed diagram of the weighting network of blocks 31 through 35. As can be seen, each of the weighting networks comprises two separate sections 84 and 85, section 84 being connected to receive the output signals from buffer amplifier 30 and section 85 being connected to receive the output signals from buffer amplifier 43. Each of the weighting networks being identically arranged, the following discussion will be limited to a description of the network 84. As can be seen, network 84 comprises a plurality of potentiometers 86, 87, 88, 89 and 90, with a first terminal of each of these potentiometers being connected to a ground or common terminal 91 and a second terminal of each potentiometer being connected to respective ones of the output terminals of buffer amplifier 30. The movable tap on each potentiometer 86 through 90 is connected via respective resistors 92, 93, 94, 95 and 96 to a first input terminal of amplifier 97. A high frequency noise bypass capacitor 98 is also connected between the first input terminal of amplifier 97 and ground terminal 91. A biasing resistor 99 is connected between a second input terminal of amplifier 97 and ground and a feedback resistor 101 is also connected between the output terminal of amplifier 97 and the second input terminal. Resistors 99 and 101 are designed to control the gain of amplifier 97 in a manner well known in the art.

As is set forth above, with the appropriate assumptions and characterizations, a turbine-generator set can be represented by a system of N inertias or masses and N−1 springs, N being equal to or greater than the number of the highest natural frequency considered. This system can be represented as an undamped system in free vibration by a second order matrix differential equation of the form $$\underline{M}\,\underline{\ddot{\Phi}} + \underline{K}\,\underline{\Phi} = \underline{0} \qquad (1)$$

where $\underline{M}$ and $\underline{K}$ are the mass and stiffness matrices of order (N × N) respectively, and $\underline{\Phi}$ is the vector of angular displacements and $\underline{\ddot{\Phi}}$ its second derivative with respect to time, of order (N × 1) This equation can be put into the standard eigenvalue form and the solution will yield one natural frequency of zero, which will not be considered and (N−1) natural frequencies $\omega_j$ with their normal mode shape vectors $\underline{\Phi}_j$. If for example, the rotational displacement of inertia 11 is measured and is $\theta(t)$ and its modal component amplitudes are $\alpha 1, \alpha 2, \ldots \alpha_{N-1}$, the rotational displacements at each inertia in the system may be calculated for each mode by means of the known normal mode shapes of the system. For example, if the normal mode shape for the system in the first mode is $\underline{\Phi}_1$, such that:

$$\underline{\Phi}_1 = \begin{bmatrix} \phi_1 \\ \vdots \\ \phi_i \\ \vdots \\ \phi_N \end{bmatrix} \qquad (2)$$

where $\phi_1 \ldots \phi_i \ldots \phi_N$ is the relative displacement of the respective inertias to a reference frame fixed to the foundation. If oscillation is measured at the $i^{th}$ location, then the torque mode shape referred to the value at that location becomes $$\underline{\Phi}_1 = \begin{bmatrix} \dfrac{\phi_1}{\phi_i} \\ \dfrac{\phi_2}{\phi_i} \\ \vdots \\ \dfrac{\phi_i}{\phi_i} = 1 \\ \vdots \\ \dfrac{\phi_N}{\phi_i} \end{bmatrix} \qquad (3)$$

If shaft section $i$ is defined to be between inertia $i$ and $i+1$ and the stiffness values for each shaft $k_l$ to $k_{N-1}$ are known, the values of the weighting network constants for the first mode, i.e., $$\underline{W}_1 = \begin{bmatrix} w_1 \\ w_2 \\ \vdots \\ w_{N-1} \end{bmatrix} \qquad (4)$$

can be found for use with measured vibration at the $i^{th}$ inertia by the equations $$w_{1,1} = \frac{\phi_1 - \phi_2}{\phi_i} k_1 \quad (5_1)$$

$$w_{i,1} = 1 - \frac{\phi_i + 1}{\phi_i} k_i \quad (5_i) \qquad (5)$$

$$w_{N-1,1} = \frac{\phi_{N-1} - \phi_N}{\phi_i} k_{N-1} \quad (5_N)$$

A similar process can be gone through to find the weighting network values for the other modes. The values of $w_{i,j}$ are the shaft spring constants multiplied by normalized angle factors which, when multiplied by the oscillating angle measured in a particular mode at inertia $i$, give the torques in each span for each mode. Thus, if the rotational displacement at inertia 11 is measured to be $\theta$ ($t$) with modal components $\alpha_1$, $\alpha_2$, ...... $\alpha_5$ as determined by the band-pass filters, the torque in the shaft between inertias 15 and 16 for example, is calculated by the weighting network using the appropriate weighting function $w_{i,j}$ for each mode with the appropriate value of $\alpha_i$:

$$\tau_5 = \alpha_1 w_{5,1} + ... + \alpha_i w_{5,i} + ... + \alpha_5 w_{5,5} \qquad (6)$$

Each value of $w_{5,1}$ through $w_{5,5}$, is used in the weighting networks to compute the values of the weighting resistors. For example, in weighting network 31, the values of $w_{i,j}$ would be used to compute values of resistors 92, 93, 94, 95 and 96, respectively. Each of these resistors attenuates or "weights" its input signal so that the sum of the weighted signals, when amplified by amplifier 97, represents a voltage proportional to the oscillatory torque in the appropriate shaft section. This torque may then be read by using the appropriate conversion factors. Potentiometers 86, 87, 88, 89 and 90 are used to provide for in-service adjustment of the weighting network, should revised calculations of the factors make this advisable.

It can be thus seen that the sensor circuits produce a signal proportional to the total oscillating shaft angle $\theta$ ($t$), the normalizing amplifiers separate this signal and supply it to the band-pass filters to develop the $\alpha_i$ components and the weighting networks perform the operation $$\tau_i = \alpha_1 w_{i,1} + ... + \alpha_j w_{i,j} + ... + \alpha_{N-1} w_{i,N-1} \qquad (7)$$

for the turbine-generator system, which for this specific case is limited to six masses and five interconnecting shafts, to produce an electrical output voltage proportional to torque for each shaft section. The band-pass filters and weighting networks may be expanded to utilize a sensor at any location and to calculate torques for any number of inertias and interconnecting shafts in a system.

This invention has been described in connection with a turbine-generator system where it has particular applicability and its operation has been set forth with reference to such use. It will be understood, however, that the torque measurement system disclosed may be used in other environments where it is necessary to determine instantaneous torque in a rotating element. It is intended, therefore, that the appended claims not be limited to the specific embodiment described, but that they cover modifications falling within the spirit and scope of the claims.

We claim:

1. Apparatus for producing a signal proportional to oscillating torque in a rotating shaft including a plurality of mass and shaft sections, said apparatus comprising:
   sensor means for providing a first signal representative of torsional oscillations of said shaft;
   filter means connected to receive said first signal for passing predetermined frequency components of said first signal; and,
   means connected to said filter means for multiplying each of said predetermined frequency components by a constant to produce second signals proportional to torque at each of said shaft sections.

2. A method for determining instantaneous torque in a rotating shaft including a plurality of mass and shaft sections comprising the steps of:
   deriving a first signal proportional to instantaneous torsional oscillations in at least one shaft section;
   separating said first signal into predetermined frequency components;
   multiplying said predetermined frequency components by predetermined proportional constants to produce a set of second signals; and,
   combining said second signals to produce a resultant signal proportional to oscillating torque at each of said shaft sections.

3. In a turbine-generator system comprising a plurality of turbine stages and a generator and including a plurality of shaft sections interconnecting said turbine stages and said generator, a torque monitoring circuit comprising:
   first sensor means associated with and sensing torque at a first shaft section for providing a first signal representative of torsional oscillations of said shaft section;
   a first plurality of filters connected to receive said first signal, each of said filters passing a predetermined frequency component of said first signal; and,
   a first plurality of weighting networks connected to receive said predetermined frequency components of said first signal from said first plurality of filters, each of said weighting networks multiplying the amplitude of each of said frequency components by a predetermined constant to form a first plurality of resultant signals, each of said weighting networks combining the corresponding resultant signals to produce a first output signal representative of torque of a corresponding one of said shaft sections.

4. The invention as defined in claim 3 and including normalizing means operatively associated with each of said filters.

5. The invention as defined in claim 3 and including a buffer amplifier connected between each of said filters and said weighting networks.

6. The invention as defined in claim 3 and including:
   second sensor means associated with a second shaft section for providing a second signal representative of torsional oscillations of said second shaft section;
   a second plurality of filters connected to receive said second signal, each of said second plurality of filters passing a predetermined frequency component of said second signal; and,
   a second plurality of weighting networks connected to receive said predetermined frequency components of said second signal from said second plurality of filters, each of said second plurality of weighting networks multiplying the amplitude of each of said frequency components by a predetermined constant to form a second plurality of resultant signals, each of said weighting networks combining the corresponding resultant signals to produce a second output signal representative of torque of a corresponding one of said shaft sections; and, selection means having a first and a second plurality of input terminals, each of said first plurality of input terminals being connected to receive a corresponding one of said first output signals and each of said second plurality of input terminals being connected to receive a corresponding one of said second output signals, said selection means being effective to select either said first output signals or said second output signals to be supplied to corresponding output terminals of said selection means.

7. The invention as defined in claim 6, wherein said selection means comprises:

a comparator having a first input terminal connected to monitor selected ones of said first plurality of filters and a second input terminal connected to monitor selected ones of said second plurality of filters, said comparator providing an output signal of first logical significance when the amplitude of said signals on said first input terminal exceed the amplitude of the signals on said second input terminal;

switching means including a first plurality of normally closed contacts and a second plurality of normally open contacts, said switching means being connected to receive said output signal from said comparator and being responsive thereto to control the state of said contacts, said normally closed contacts being connected between corresponding ones of said first plurality of input terminals of said selection means and corresponding ones of said output terminals of said selection means and said normally open contacts being connected between corresponding ones of said second plurality of input terminals of said selection means and corresponding ones of said output terminals of said selection means.

8. The apparatus as defined in claim 6, and including:

third sensor means connected to monitor the electrical wave form from said generator for supplying a third signal proportional to the oscillatory frequency of the generator electrical output;

a third plurality of filters connected to receive said third signal from said third sensor, each of said filters passing a predetermined frequency component of said third signal; and, means connected to monitor the oscillatory amplitude of the output signals of each of said third plurality of filters and responsive thereto to provide an electrical signal indicative of the state of said generator electrical output.

9. The apparatus of claim 8 wherein said output of said third set of filters is used to actuate an alarm when any one of said signals exceeds a predetermined level.

10. The apparatus of claim 8 wherein said output of said third plurality of filters is further processed through weighting networks to provide a signal representative of electrical oscillations in the electrical output of said generator.

* * * * *